April 12, 1966     T. F. SCHWARTZ     3,245,158
SONIC READING DEVICE
Filed May 15, 1964     2 Sheets-Sheet 2
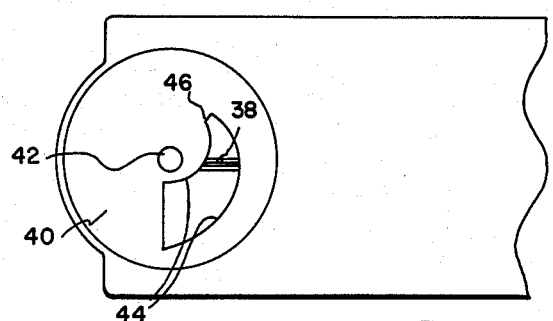
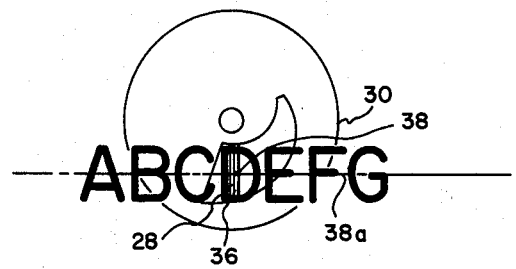
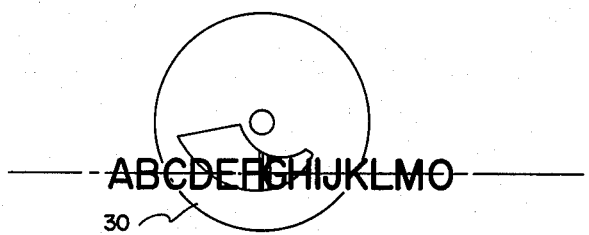
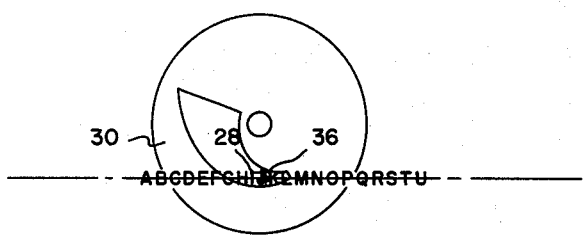
INVENTOR.
THEODORE F. SCHWARTZ
BY

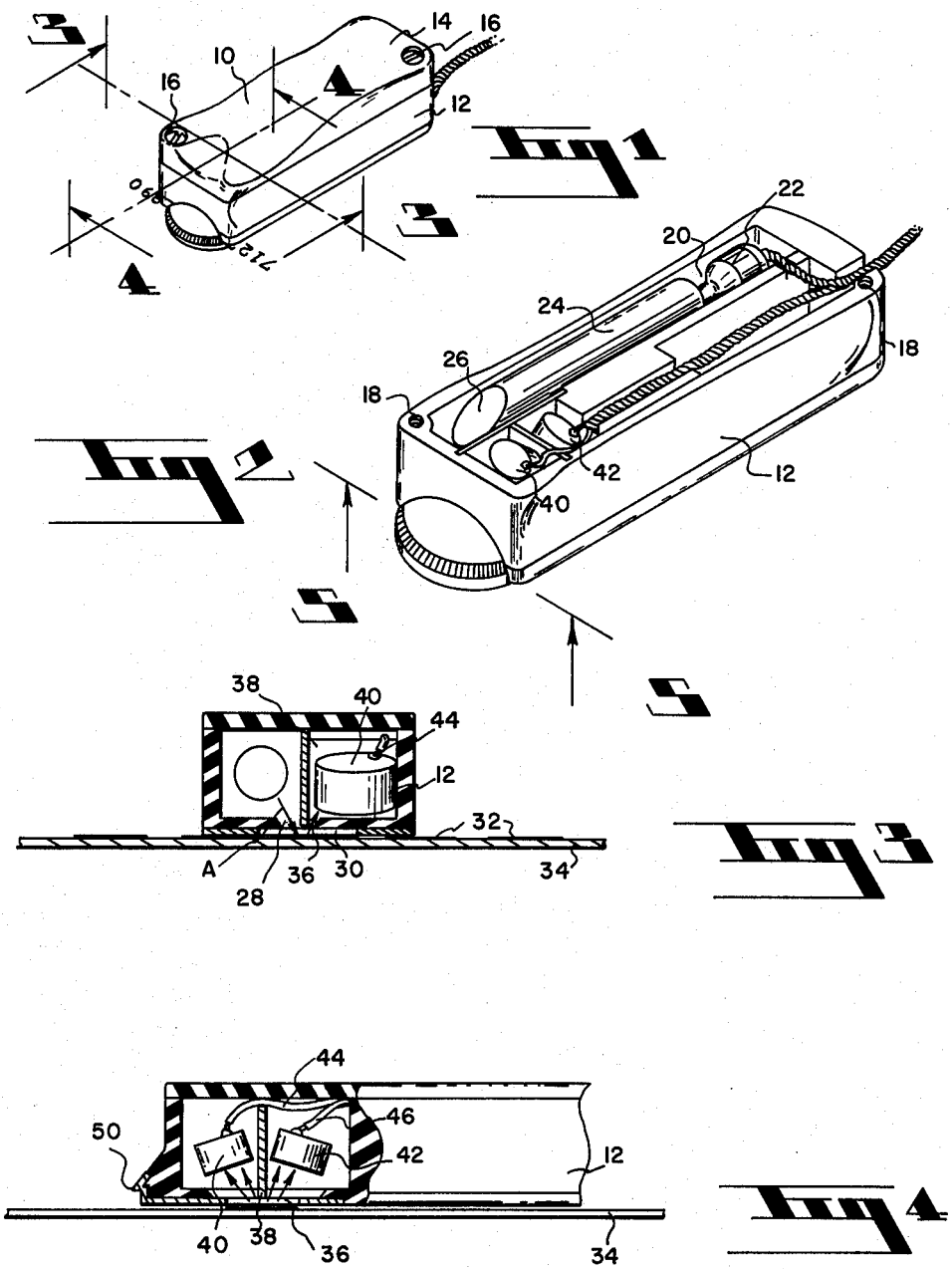

3,245,158
SONIC READING DEVICE
Theodore F. Schwartz, 11660 St. Andrews Way, Scottsdale, Ariz.
Filed May 15, 1964, Ser. No. 367,798
6 Claims. (Cl. 35—35)

This invention relates to a sonic reading device and more particularly to a sonic reading device for use by the blind for sonic recognition of conventional typewritten or printed matter and more particularly to a sonic reading device having a scanning window divided by a partition on the opposite sides of which are disposed light sensitive elements and wherein a converging window divides the light evenly on opposite sides of the partition so that the separate light sensitive elements are sensitive to portions of letters above and below a median line thereof for distinguishing sonically the upper portions and lower portions and whereby the converging window is adjustable so that characters or printed matter of different vertical dimensions may readily be distinguished by adjusting the width of the window relative to the partition.

In sonic reading devices for use by the blind, various means have been employed sonically to distinguish variations in printed matter and/or characters. However, it has been a problem to provide a suitable sonic reading device for use by the blind which is readily and easily useful for sonically reading a typewritten or printed subject matter employing or containing characters of different dimensions such as those in a news paper or on a menu, for example. Accordingly, it is an object of the present invention to provide a sonic reading device in which a movably adjustable converging slotted window is disposed adjacent to a partitioned window area on the opposite sides of which individual light sensitive devices are disposed to receive light reflected from printed matter or the like, whereby the convergingly slotted window may be adjusted in a direction laterally of the partition in order to limit evenly space at opposite sides of the partition so that the partition may be run along the median area of various sized letters in accordance with the adjustment of the converging window and, thus, limit the location and maneuverability of the device to typewritten subject matter of a given elevation, as desired.

Another object of the invention is to provide a very simple sonic reading device having a rotary element having a generally arcuate converging slot therein operable to move transversally of a partition on opposite sides of which a pair of light sensitive elements are located so that when the light sensitive elements are responsive to upper and lower portions of characters above and below a median area thereof that the converging slot structure may be adjusted to limit the band of light reflected from the characters to the exact vertical or up and down dimensions of the characters being read.

Another object of the invention is to provide a novel sonic reading device which is provided with very simple means to adjust the device and restrict the light receiving area thereof to the elevation of various sized letters.

A further object of the invention is to provide a very simple and economical sonic reading probe which is readily and easily adjustable to restrict the reading of the operator to subject matter within the scope of certain sized characters, as desired.

Further objects and advantages of the invention may be apparent from the following specification, appended claims and accompanying drawings, in which:

FIG. 1 is a perspective view of the sonic reading device of the present invention;

FIG. 2 is an enlarged view similar to FIG. 1 showing the cover of the casing of the invention removed;

FIG. 3 is a transverse sectional view of the invention taken from the line 3—3 of FIG. 1;

FIG. 4 is a fragmentary sectional view taken from the line 4—4 of FIG. 1;

FIG. 5 is a fragmentary elevational view taken from the line 5—5 of FIG. 2 showing a movably adjustable converging window structure of the invention adapted to align the sonic reading device of the invention with the upper and lower limits of the various sized characters;

FIG. 6 is a diagrammatic view illustrating one position of the converging slotted window structure illustrated in FIG. 5;

FIG. 7 is another view similar to FIG. 6 showing the slotted structure in a further adjusted position; and FIG. 8 is a still further view similar to FIG. 6 and showing the slotted window structure of the invention in a further adjusted position.

As shown in FIG. 1 of the drawings, the invention includes housing 10 composed of a hollow body 12 and a cover 14 secured thereto by screws 16.

As shown in FIG. 2 of the drawings, the cover 14 is removed from the housing 12 and internally screw threaded holes 18 are shown. These holes receive externally screw threaded portions of the screws 16 to hold the cover 14 in place.

The body 12 is provided with a cavity 20 in which an electric lamp 22 is located. This lamp 22 axially illuminates a transparent rod 24 which may be made of Plexiglass such as methyl methacrylate or other suitable light conducting material. The rod 24 is provided with an angular reflector plane portion 26 at an end opposite to that adjacent to which the lamp 22 is disposed. This plane 26 is generally disposed at an angle of 45° or any suitable angle desired for the projection of light in a direction as indicated by an arrow A in FIG. 3 of the drawings. The light from the plane 26, thus, passes downwardly through a window 28 in the housing 12 and through an adjustable slotted window opening 30, as will be hereinafter described.

The light passing in the direction of the arrow A through the window 28 is utilized to illuminate the characters 32 on a sheet or plate 34. These characters 32 may be any typewritten or printed matter of various sizes, as will be hereinafter described. The light reflected from the characters 32 passes through a narrow slot portion 36 of a window opening. This slot 36 extending into communication with opposite sides of a partition 38 which separates a pair of light sensitive elements 40 and 42. These light sensitive elements are connected to respective conductors 44 and 46 and these conductors 44 and 46 are connected to individual electronic amplifiers tuned generally to a different frequency so that upper portions of letters above a median location of the partition 38 may be distinguished by one tone while lower portions of the letters below the partition 38 may be distinguished by other tones.

Positioned normally below the slotted windows 28 and 36 is a movable slotted window member 40 which is rotatably mounted on the lower portion of the body or housing 12 by means of a pin 42. The rotating or movable window is provided with a curved converging slotted window opening 30 which is provided with a wide portion 44 and a relatively narrow portion 46. The wide portion is disposed to be rotated into position relative to the slots 28 and 36, as shown in FIG. 6 of the drawings, to read wide letters while the slotted window 30 is disposed to be rotated progressively into a position wherein narrower portions of the slotted opening 30 correspond with relatively smaller letters and it will be seen that the partition 38 is located so that the converging slotted windows 30 always maintain its median portion aligned with the partition 38 in order that an equal space above and below the partition is exposed to correspond with the upper and lower portions of the typewritten characters or letters and so that the partition 38 will be caused to traverse broken lines 38a as shown in FIG. 6 or a comparable median location of the relatively smaller letters illustrated in FIGS. 7 and 8 of the drawings.

It will be obvious to those skilled in the art that movable slotted window 30 might be arranged to slide in a rectilinear fashion and that the sides of the slotted window might be straight and slightly converging, however, such structure would be more bulky and accordingly, the invention has been worked out in the embodiment shown simply for the compactness of the structure and the relative ease of operation. It will be seen that the peripheral portion of the rotating slotted window structure 40 is provided with a peripheral portion 50 which projects beyond the edge of the housing or body 12 so that it may readily be engaged by a person's finger manually to adjust the rotary converging windows 30 when the slotted window structure of the invention is disposed adjacent an upper surface of a sheet 34, as shown in FIGS. 3 and 4 of the drawings. A person who is sonically exploring typewritten or printed matter may adjust the window until the separate tones generated by amplifiers in connection with the light sensitive elements 40 and 42 correspond with the height of the letters. When this is accomplished, the converging window 30 may be adjusted, as shown in FIGS. 5 to 8 of the drawings, in correspondence with the particular size of letters or characters and then the partition 38 is moved longitudinally of the brokken lines 38a at a median location between upper and lower portions of the letters in order that a reading of the upper portions of the letters may be separate from that of the lower portions of the letters and so that the entire window space may equal the vertical height of the letters regardless of their vertical dimensions which may be within the dimensional limitations of the slotted window 30.

It will be obvious to those skilled in the art that various modifications of the present invention may be resorted to in a manner limited only by a just interpretation of the following claims.

I claim:

1. In a sonic reading device the combination of: a reading probe housing having a scanning window at a normally lower side thereof; a partition in said housing extending downwardly into close proximity with said window when said sonic reading device is in a reading position on a horizontal plane; a light source on one side of said partition; a plurality of light sensitive elements on the opposite side of said partition; a second partition between said plurality of light sensitive elements whereby light from said source may pass through said window to illuminate characters on a sheet or surface adjacent thereto so that illumination relative to said characters on said surface is sensed by said light sensitive elements; said light sensitive elements each adapted to be individually coupled to individual amplifiers which may operate at different sonic frequencies; and a movable window means movably mounted relative to said first mentioned window, said movable window having a converging slot therein disposed to be operable so that the converging portions of the slot are equal distance from the opposite sides of said second mentioned partition equally to divide the movable slot at opposite sides of said second mentioned partition so that each of said light sensitive elements may be responsive to light emitted from a comparable portion above or below the center of printed matter or characters on a page; means movably mounting said movable window means to convergingly adjust the limits of said converging slot so that it may read large or small characters above and below the center line thereof, thereby permitting adjustment of said adjustable window to correspond with the normally vertical dimensions of various printed matter or characters.

2. In a sonic reading device the combination of: a reading probe housing having a scanning window at a normally lower side thereof; a partition in said housing extending downwardly into close proximity with said window when said sonic reading device is in a reading position on a horizontal plane; a light source on one side of said partition; a plurality of light sensitive elements on the opposite side of said partition; a second partition between said plurality of light sensitive elements whereby light from said source may pass through said window to illuminate characters on a sheet or surface adjacent thereto so that illumination relative to said chaarcters on said surface is sensed by said light sensitive elements; said light sensitive elements each adapted to be individually coupled to individual amplifiers which may operate at different sonic frequencies; and a movable window means movably mounted relative to said first mentionad window, said movable window having a converging slot therein disposed to be operable so that the converging portions of the slot are equal distance from the position opposite sides of said second mentioned partition equally to divide the movable slot at opposite sides of said second mentioned partition so that each of said light sensitive elements may be responsive to light emitted from a comparable portion above or below the center of printed matter or characters on a page; means movably mounting said movable window means to convergingly adjust the limits of said converging slot so that it may read large or small characters above and below the center line thereof, thereby permitting adjustment of said adjustable window to correspond with the normally vertical dimensions of various printed matter or characters; said movable window being rotatably mounted relative to said first mentioned window, said converging slotted portion being in a generally arcuate shape whereby rotation of said movable window means may project said slotted window relative to said second partition and evenly dispose and divide said slotted window relative to said second partition.

3. In a sonic reading device the combination of: a reading probe housing having a scanning window at a normally lower side thereof; a partition in said housing extending downwardly into close proximity with said window when said sonic reading device is in a reading position on a horizontal plane; a light source on one side of said partition; a plurality of light sensitive elements on the opposite side of said partition; a second partition between said plurality of light sensitive elements whereby light from said source may pass through said window to illuminate characters on a sheet or surface adjacent thereto so that illumination relative to said characters on said surface is sensed by said light sensitive elements; said light sensitive elements each adapted to be individually coupled to individual amplifiers which may operate at different sonic frequencies; and a movable window means movably mounted relative to said first mentioned window, said movable window having a converging slot therein disposed to be operable so that the converging portions of the slot are equal distance from the opposite sides of said second mentioned partition equally to divide the movable slot at opposite sides of said second mentioned partition so that each of said light sensitive elements may be responsive to light emitted from a comparable portion above or below the center of printed matter or characters on a page; means movably mounting said movable window means to convergingly adjust the limits of said converging slot so that it may read large or small characters above and below the center line thereof, thereby permitting adjustment of said adjustable window to correspond with the normally vertical dimensions of various printed matter or characters; said movable window being rotatably mounted relative to said first mentioned windows, said converging slotted portion being in a generally arcuate shape whereby rotation of said movably window means, may project said slotted window relative to said second partition and evenly dispose and divide said slotted window relative to said second partition; a peripheral portion of said movable window means being exposed relative to said probe housing for manual rotary operation of said movable window.

4. In a sonic reading device the combination of: a reading probe housing having a scanning window at a normally lower side thereof; a partition in said housing extending downwardly into close proximity with said window when said sonic reading device is in a reading position on a horizontal plane; a light source on one side of said partition; a plurality of light sensitive elements on the opposite side of said partition; a second partition between said plurality of light sensitive elements whereby light from said source may pass through said window to illuminate characters on a sheet or surface adjacent thereto so that illumination relative to said characters on said surface is sensed by said light sensitive elements; said light sensitive elements each adapted to be individually coupled to individual amplifiers which may operate at different sonic frequencies; and a movabe window means movably mounted relative to said first mentioned window, said movable window having a converging slot therein disposed to be operable so that the converging portions of the slot are equal distance from the opposite sides of said second mentioned partition equally to divide the movable slot at opposite sides of said second mentioned partition so that each of said light sensitive elements may be responsive to light emitted from a comparable portion above or below the center of printed matter or characters on a page; means movably mounting said movable window means ot convergingly adjust the limits of said converging slot so that it may read large or small characters above and below the center line thereof, thereby permitting adjustment of said adjustable window to correspond with the normally vertical dimensions of various printed matter or characters; said light source comprising a light bulb, transparent light transmitting rod having an angular plane portion adapted to reflect light through said first mentioned window at an opposite side of said first partition from said light sensitive elements.

5. In a sonic reading device the combination of: a reading probe housing having a scanning window at a normally lower side thereof; a partition in said housing extending downwardly into close proximity with said window when said sonic reading device is in a reading position on a horizontal plane; a light source on one side of said partition; a plurality of light sensitive elements on the opposite side of said partition; a second partition between said plurality of light sensitive elements whereby light from said source may pass through said window to illuminate characters on a sheet or surface adjacent thereto so that illumination relative to said characters on said surface is sensed by said light sensitive elements; said light sensitive elements each adapted to be individually coupled to individual amplifiers which may operate at different sonic frequencies; and a movable window means movably mounted relative to said first mentioned window, said movable window having a converging slot therein disposed to be operable so that the converging portions of the slot are equal distance from the opposite sides of said second mentioned partition equally to divide the movable slot at opposite sides of said second mentioned partition so that each of said light sensitive elements may be responsive to light emitted from a comparable portion above or below the center of printed matter or characters on a page; means movably mounting said movable window means to convergingly adjust the limits of said converging slot so that it may read large or small characters above and below the center line thereof, thereby permitting adjustment of said adjustable window to correspond with the nomally vertically dimensions of various printed matter or characters; said light source comprising a light bulb, transparent light transmitting rod having an angular plane portion adapted to reflect light through said first mentioned window at an opposite side of said first partition from said light sensitive elements; said probe housing being elongated in a plane of reading subject matter adjacent to which said first mentioned window is used when scanning printed matter.

6. In a sonic reading device the combination of: a reading probe housing having a scanning window at a normally lower side thereof; a partition in said housing extending downwardly into close proximity with said window when said sonic reading device is in a reading position on a horizontal plane; a light source on one side of said partition; a plurality of light sensitive elements on the opposite side of said partition; a second partition between said plurality of light sensitive elements whereby light from said source may pass through said window to illuminate characters on a sheet or surface adjacent thereto so that illumination relative to said characters on said surface is sensed by said light sensitive elements; said light sensitive elements each adapted to be individually coupled to individual amplifiers which may operate at different sonic frequencies; and a movable window means movably mounted relative to said first mentioned window, said movable window having a converging slot therein disposed to be operable so that the converging portions of the slot are equal distance from the opposite sides of said second mentioned partition equally to divide the movable slot at opposite sides of said second mentioned partition so that each of said light sensitive elements may be responsive to light emitted from a comparable portion above or below the center of printed matter or characters on a page; means movably mounting said movable window means to convergingly adjust the limits of said converging slot so that it may read large or small characters above and below the center line thereof, thereby permitting adjustment of said adjustable window to correspond with the normally vertical dimensions of various printed matter or characters; said light source comprising a light bulb, transparent light transmitting rod having an angular plane portion adapted to reflect light through said first mentioned window at an opposite side of said first partition from said light sensitive elements; said probe housing being elongated in a plane of reading subject matter adjacent to which said first mentioned window is used when scanning printed matter; conductors coupled to said light source and said light sensitive elements and adapted to be connected to sonic amplifiers.

References Cited by the Examiner

UNITED STATES PATENTS

| | | | |
|---|---|---|---|
| 2,420,716 | 5/1947 | Morton et al. | |
| 2,475,444 | 7/1949 | Cashin | 35—35.1 |
| 3,007,259 | 11/1961 | Abma et al. | 35—35.1 |

EUGENE R. CAPOZIO, *Primary Examiner.*